A. E. LUTEY.
PLANT RECEPTACLE.
APPLICATION FILED AUG. 9, 1918.
1,297,484.
Patented Mar. 18, 1919.
Fig. 1.
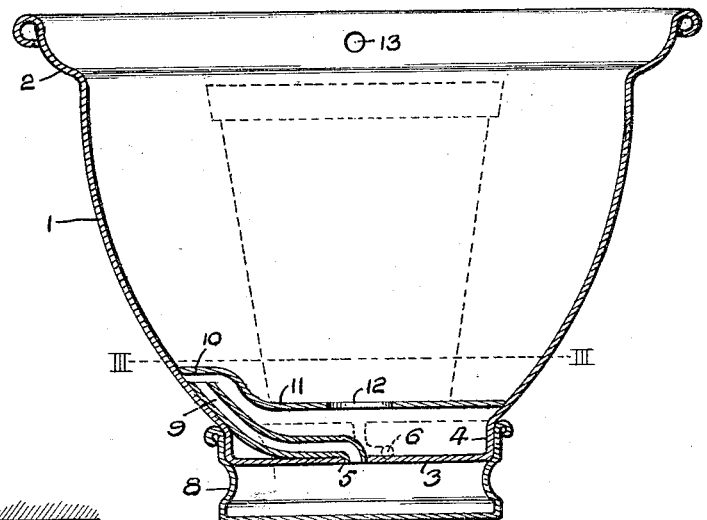
Fig. 2.
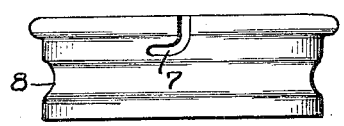
Fig. 3.
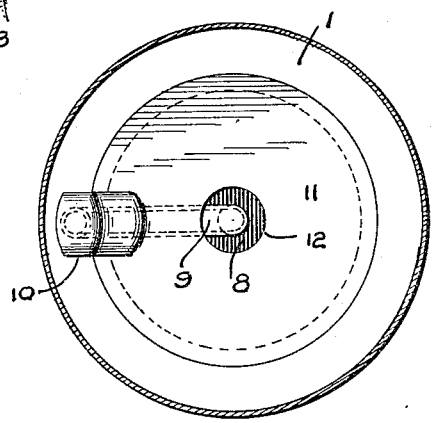
Fig. 4.
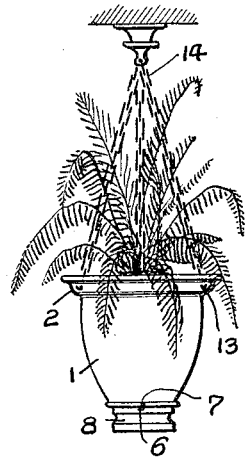
Fig. 5.
Inventor
ALBERT E. LUTEY,
Witness
Karl H. Butler
Chas. W. Stauffiger
By
Attorneys

UNITED STATES PATENT OFFICE.

ALBERT E. LUTEY, OF DETROIT, MICHIGAN.

PLANT-RECEPTACLE.

1,297,484.   Specification of Letters Patent.   Patented Mar. 18, 1919.

Application filed August 9, 1918. Serial No. 249,091.

*To all whom it may concern:*

Be it known that I, ALBERT E. LUTEY, a citizen of the United States of America, residing at Detroit, in the county of Wayne and State of Michigan, have invented certain new and useful Improvements in Plant-Receptacles, of which the following is a specification, reference being had therein to the accompanying drawing.

This invention aims to provide a novel plant receptacle which may be used as a jardinière for holding a potted plant, as a container for unpotted plants or wire baskets and in either instance the container may be suspended similar to a wire basket or placed on a suitable support, and as an ornamental bowl.

The plant receptacle is characterized by having an inner false bottom, a drain tube, and an outer false bottom or drip pan. The inner false bottom is apertured so that it may be easily placed in and removed from the receptacle, the aperture also permitting of water or other liquid draining into the bottom of the receptacle. The inner false bottom constitutes a support for a potted plant or wire basket and said false bottom is provided with a novel guard for the drain tube of the receptacle. The guard will prevent dirt and other foreign matter from clogging the drain tube, and said tube is disposed so as not to interfere with the plants placed in the receptacle and so as to conveniently permit of the drainage from the receptacle being regulated. The outer false bottom or drip pan is detachably connected to the bottom of the receptacle and said pan is adapted to receive water from the drain tube and coöperate with the bottom of the receptacle in holding a sufficient quantity of water for the proper propagation or refreshing of potted plants or flowers placed in the receptacle, also to prevent water from dripping on floors and carpets.

My invention further aims to provide an ornamental bowl shaped receptacle that may be spun, stamped, beaten or otherwise shaped from brass, copper or a suitable metal, possessing either its natural finish or finished so as not to corrode and so as to present a neat and attractive appearance.

The invention will be hereinafter specifically described and then claimed, and reference will now be had to the drawing, wherein—

Figure 1 is a vertical sectional view of the plant receptacle, showing in dotted lines a flower pot supported therein;

Fig. 2 is a side elevation of a detached drip pan;

Fig. 3 is a horizontal view taken on the line III—III of Fig. 1;

Fig. 4 is a side elevation of a plant receptacle used as a container and suspended from a suitable support, and Fig. 5 is a similar view of the plant receptacle, devoid of the drip pan and used as an ordinary flower pot.

In the drawing, the reference numeral 1 denotes a bowl shaped receptacle having the upper edges thereof flared, rounded or ornamented, and said receptacle has the lower end thereof reduced or contracted and closed to provide a flat bottom wall 3 and an annular vertical wall 4, said flat bottom wall having a central opening 5.

The vertical annular wall 4 has a plurality of radially disposed and outwardly extending pins or studs 6 adapted to extend into angular or bayonet shaped slots 7 of a detachable drip pan 8, which when attached to the receptacle 1 has its bottom in spaced relation to the bottom wall 3 so as to form an auxiliary receptacle or container into which water may drain. In attaching the drip pan to the bottom of the receptacle 1, it is only necessary to push said drip pan on to the reduced lower end of the receptacle and partially rotate the same, said drip pan being limited by its open end engaging the walls of said receptacle. The pin and bayonet slot connection between the detachable drip pan and said receptacle constitutes a conventional form of fastening means for detachably holding said drip pan.

Fixed in the opening 5 of the bottom plate 3 is the lower end of a drain tube 9, said tube extending to a side wall of the receptacle 1 where it may be soldered or otherwise secured. The drain tube 9 has the upper end thereof open and protected by a guard 10 carried by an inner bottom plate 11 which rests on the inner side walls of the receptacle 1 in spaced relation to the bottom plate 3. The inner bottom plate 11 constitutes a false bottom and has a central opening 12 serving two purposes. First, the opening 12 provides clearance for a finger to facilitate placing the false bottom in the receptacle or removing the same. Second, it permits of water draining into the receptacle where it may accumulate to afford moisture to a plant and overflow into the upper end of the drain tube 9 and pass downwardly into the drip pan 8. It is also possible to place a sponge under the plate 11 to assist in maintaining moisture for a plant.

The upper edges 2 of the receptacle 1 may be apertured, as at 13, so that a suitable hanger 14 may be attached to the receptacle when it is desired to suspend the same from a suitable support, as shown in Fig. 4.

From the foregoing, it will be observed that I have devised a self watering jardinière or plant receptacle which will preclude any danger of a plant having too much water, causing the soil around the plant roots to become soured and eventually destroy the plant, and also obviate dryness or an insufficient supply of moisture. By having the inner bottom plates of various diameters it is possible to support flower pots of various depths within the receptacle 1 and with one of these false bottoms in position, it is possible to plant a flower directly in the receptacle, since any dirt that should pass through the opening 12 of the false bottom will be collected between said false bottom and the bottom plate 3. It is also possible to plant a flower in the receptacle 1 without the false bottom 11 and provide the drain tube 9 with a wick so that water placed in said detachable drip pan 8 may be carried to the plant by capillary attraction, and thus insure a proper quantity of water for the propagation of the plant.

It is thought that the utility of my invention will be apparent without further description, and while in the drawings there is illustrated a preferred embodiment, it is to be understood that the structural elements are susceptible to such variations and modifications as fall within the scope of the appended claims.

What I claim is:—

1. A receptacle of the character described comprising a container having the bottom thereof provided with an opening, pot supporting means in said container, a drain tube having one end thereof mounted in the opening of said container and the opposite end thereof extending above said pot supporting means, and a drip pan detachably connected to the bottom of said container.

2. A receptacle of the character described, comprising a container, a drain tube in said container and open at the bottom thereof, and a false bottom plate in said container having a guard for said drain tube.

3. A receptacle of the character described, comprising a container having the bottom thereof provided with an opening, a drain tube in the bottom of said container communicating with the opening thereof and extending to one of the side walls of said container, an apertured false bottom plate seated in said container and provided with a guard at one edge thereof for said drain tube, and a detachable drip pan carried by the bottom of said container.

4. A receptacle of the character described comprising a container, a drain tube communicating with the bottom thereof and having its upper end above the bottom of said container, a detachable drip pan carried by said container and communicating with said drain tube, and detachable means in said container below the upper end of said drain tube adapted for supporting the contents of said container in spaced relation to said drain tube so that water may accumulate in the bottom of said container before flowing into said drain tube.

5. A receptacle of the character described comprising a bowl shaped container having the lower end thereof reduced to provide a vertical annular wall, a detachable drip pan carried by the annular wall of said container, a drain tube having one end thereof communicating with said drip pan and the opposite end thereof extending upwardly at a side wall of said container, and an apertured false bottom plate seated in said container in spaced relation to the bottom thereof and provided with a guard for the upper end of said drain tube.

In testimony whereof I affix my signature in the presence of two witnesses.

ALBERT E. LUTEY.

Witnesses:
KARL H. BUTLER,
ANNA M. DORR.

Copies of this patent may be obtained for five cents each, by addressing the "Commissioner of Patents, Washington, D. C."